United States Patent [19]

Stodolski

[11] 4,010,461

[45] Mar. 1, 1977

[54] ALERTING SYSTEM WITH DUAL-ADDRESS MEMORY

[75] Inventor: Thomas Raymond Stodolski, Cambridge, Mass.

[73] Assignee: Bell & Howell Company, Chicago, Ill.

[22] Filed: Jan. 17, 1975

[21] Appl. No.: 541,873

[52] U.S. Cl. .................................. 340/311; 325/64; 325/466; 340/164 R; 340/171 A

[51] Int. Cl.[2] .......................................... H04M 11/02

[58] Field of Search ........... 340/311, 164 R, 171 A, 340/312, 173 AM; 325/55, 64, 466; 179/41 A

[56] References Cited

UNITED STATES PATENTS

| | | | |
|---|---|---|---|
| 3,513,399 | 5/1970 | Wycoff | 325/466 |
| 3,564,150 | 2/1971 | Muller | 179/41 A |
| 3,581,013 | 5/1971 | Muller | 179/41 A |
| 3,641,276 | 2/1972 | Keller | 179/41 A |
| 3,694,579 | 9/1972 | McMurray | 179/41 A |
| 3,729,595 | 4/1973 | Sarati et al. | 179/41 A |
| 3,742,481 | 6/1973 | Nickerson | 340/311 |
| 3,763,324 | 10/1973 | Garcia et al. | 179/41 A |
| 3,832,636 | 8/1974 | Kubo | 325/466 |

*Primary Examiner*—John W. Caldwell
*Assistant Examiner*—James J. Groody
*Attorney, Agent, or Firm*—Alfred H. Rosen; Frank A. Steinhilper

[57] ABSTRACT

A dual address paging receiver is described having page memory for automatically storing a page in the mode addressed if the user does not reset the receiver within a prescribed time interval after an alert signal is started. After a page is stored it can be recalled in the mode addressed from page memory by operating the reset button.

The receiver provides two different kinds of alert signals depending upon the mode in which it is addressed. The receiver also provides a unique turn-on signal.

17 Claims, 3 Drawing Figures

ALERTING SYSTEM WITH DUAL-ADDRESS MEMORY

BACKGROUND OF THE INVENTION

This invention relates in general to multi-address alerting devices employed in a system for alerting one or some of a large number of persons from a central paging station. In practice, for example, a caller of such a person may reach the central station by telephone, and the paging station may signal to the person via a radio common carrier (RCC) link. The invention thus relates more particularly, by way of example, to personal paging devices which can be carried on the person of a user, for response to space-transmitted calling signals such as radio waves. Alert signals provided by such devices may be audible, visible or tactual (e.g.: vibratory), and alerting devices are known which give the user a choice of one or more alerting modes. Whatever alerting mode or modes are employed in a particular alerting device, the user must be wearing the alerting device, or at least be sufficiently close to it to perceive the alerting signal, in order for the alerting device to accomplish its purpose. This invention is addressed generally to situations in which a user of an alerting device which is energized to receive calling signals nevertheless fails for one reason or another to perceive an alerting signal that is provided by the device in response to a calling signal; and more particularly to the effective use in such situations of an alert device that has the capability of issuing an alerting signal in one of two or more different modes in response to a calling signal which is addressed to one only of the available modes.

In the art of paging persons by means of portable alerting devices, such as radio receivers carried on the person that are responsive to an assigned carrier frequency, it is known to modulate the carrier with a sequence of calling frequencies, or "tones", for the purpose of signalling to subscribers with unique combinations of tones, for example, to address a particular subscriber, or to broadcast a particular message. A known two-tone paging system uses two tones selected in a coded sequence from an array of available tones. In another system, five tones are sent out (i.e.: modulate the carrier) in a coded sequence, but the number of tones used in a given coded sequence is not critical. In any system, each individual receiver is responsive, through a tone-responsive network or the like, to a selected one or few of all the possible useful codes. In a five tone paging system which is in common use, each tone last 33 milliseconds, and there is a 35 millisecond gap between pages, resulting in $(5 \times 33) + 35 = 200$ milliseconds for a complete page. Such a 5-tone paging system allows five pages per second. Thus, an alerting device in such a system has one-fifth of a second to receive a calling or paging signal and to provide an alerting signal in response to it. The alerting signal can, however, have duration and form which are each independent of the duration and form, respectively, of the paging signal.

Paging systems are known which provide the user with two modes of alerting signal and means in the receiver automatically to select a particular mode in response to a particular tone-code modulation of the carrier. Such systems are sometimes known as "dual address" paging systems, and they add to the paging art the capability of addressing a choice of one of two possible messages to a particular subscriber.

Paging system receivers are known in which calling information is stored if not responded to within a specified time interval. An example is disclosed in the application for U.S. patent of James DeRosa, Ser. No. 532,059 filed Dec. 12, 1974, which is assigned to the same assignee as the present application. In alerting systems of the kind that is described by DeRosa, the receiver is provided with some means to terminate an alerting signal and to set the device in condition to respond to another paging or calling signal. In the described example, that means is a manually-operable switch labelled "reset"; and conveniently that switch is of the momentary-contact type. Upon perceiving an alert signal, the user operates the reset switch. If within a prescribed time interval after initiating an alert signal the alerting device does not receive from the user a signal (e.g.: operation of a reset switch) that the user has perceived the alert signal, the device itself automatically terminates the alert signal and stores in a page memory the information that a calling signal was received. This information is retained in the page-memory until the alerting device is de-energized (by being shut-off, or depletion of its power supply if a battery is used), or until the user operates the reset switch. Thereafter, if the reset switch is operated, the alerting device will again initiate an alert signal, and in that situation the reset switch functions additionally and alternatively as a recall switch. A second operation of this switch terminates the recalled alert signal and resets the receiver into condition for receiving another calling signal and providing an alert signal in response to it.

GENERAL NATURE OF THE INVENTION

The present invention provides a paging receiver having both page memory and dual-address capabilities that remembers which address was paged. The receiver incorporates a dual-address memory for conditioning a signal mode selector to drive an alert signal generator in a selected mode. The dual-address memory is set by one of two signals available from the tone-responsive decoder network and chosen by the modulation tone code on the incoming page or calling signal. Signals for driving the alert signal generator are provided within the receiver in response to any calling signal that will pass the decoder network. In addition the receiver can be made to provide on turn-on a unique alerting signal in a mode that is different from any of the modes selected in response to a calling signal.

DETAILED DESCRIPTION OF THE DRAWINGS

Figure 1:
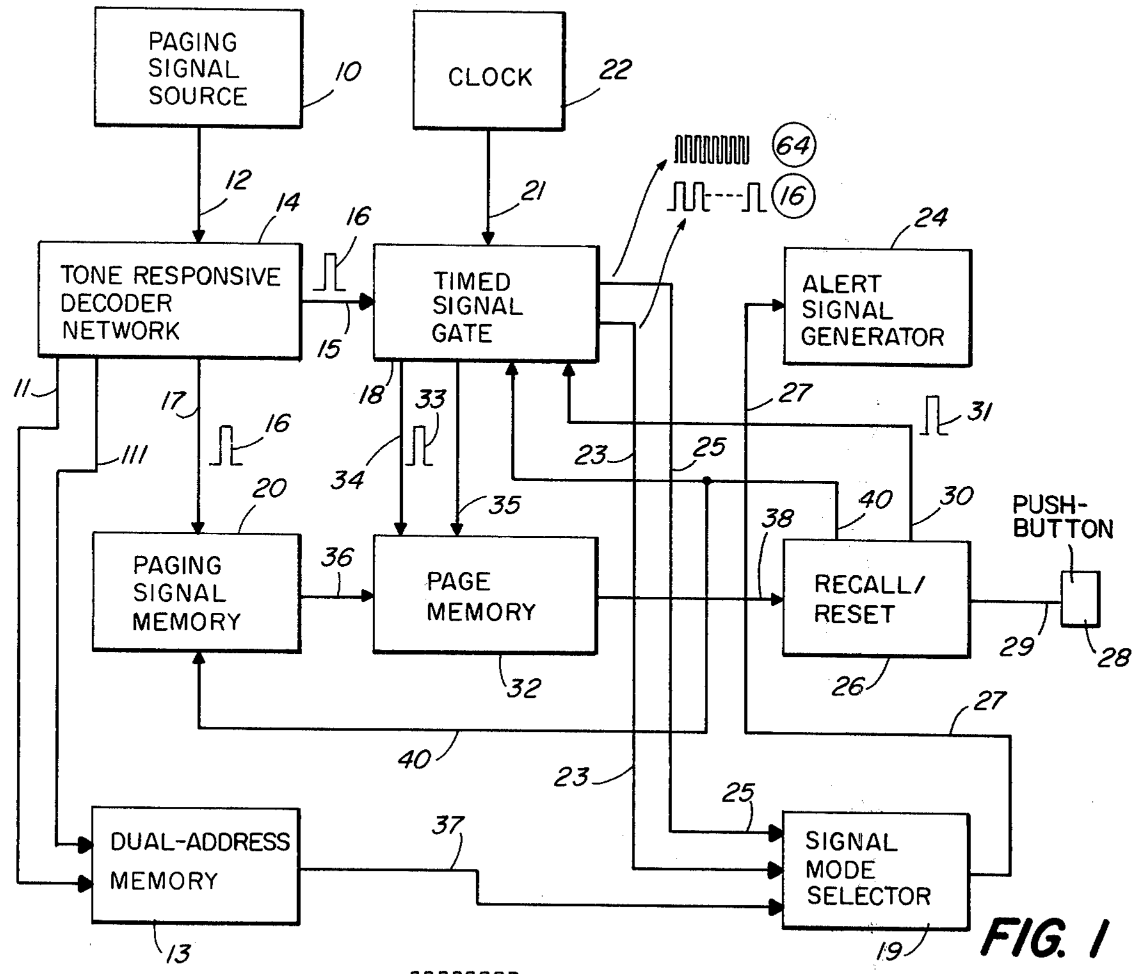
FIG. 1 is a block diagram of a page memory system.

A paging or calling signal source 10 may be an incorporated receiver of space-transmitted paging signals, or it may be a remote generator of paging signals. Paging or calling signals are supplied by this source to a tone-responsive decoder network 14 (which may be of any known form) over line 12. If the signals supplied are those to which the system is intended to respond, the network 14 supplies a signal pulse 16 over line 15 to a timed signal gate 18 and over line 17 to a paging signal memory 20, and a state changing signal to a dual-address memory 13 over line 11 or 111. Under control of a clock 22 via line 21 the gate 18 will activate an alert signal generator 24 for a prescribed interval of time. The output lines 23 and 25 from the gate 18 will each carry a different alerting signal, for example, a train of 16 pulses, or a train of 64 pulses, respectively, within that same prescribed time interval, one of which alerting signals will be applied to the alert signal generator 24 over line 27 via and as selected by the signal mode selector 19, which in turn is conditioned to make its selection by a signal supplied over line 37 from the dual-address memory 13. If within the prescribed time interval a user of the system perceives the alert signal and activates recall/reset components 26, for example, via line 29 by operating a momentary-contact switch through a push-button 28, the recall/reset components will provide a signal 31 over reset line 30 to the timed signal gate, to terminate operation of the alert signal generator. If on the other hand the reset button 28 is not operated within the prescribed time interval, the gate 18 will at the end of that interval terminate operation of the alert signal generator 24 and send a memory-alert signal 33 to the page memory components 32 over line 34. The paging signal memory 20, already containing the information that a paging or calling signal has been received, has set the page memory 32 into condition via line 36 to be set into a stored-page state and thereby provide a state changing signal to the recall/reset components 26 over line 38 in response to the memory-alert signal from line 34. The recall/reset components 26 are thus changed from the normal reset-function state to a state suitable for a recall function. If now a user operates the push-button 28, the recall/reset components will over recall line 40 initiate a cycle of operation of the timed signal gate 18 that is similar to the alerting signal mode which was initiated by the signal pulse 16 under control of the dual-address memory 13. Simultaneously, the paging signal memory 20 is reset via recall line 40. Shortly thereafter, as will be explained in greater detail below, the page memory 32 is reset via line 35 to a non-stored-page condition. This will restore the recall/reset components 26 to the normal reset-function state existing before receiving the state-changing signal. Upon perceiving the alert signal the user can now terminate it with the push-button 28, via reset line 30.

The Tone-Responsive Decoder Network 14 may incorporate the design of a multifrequency linear filter network as described in the application of the present inventor and another, Ser. No. 510,787 filed Sept. 30, 1974 now U.S. Pat. No. 3,952,288 which is assigned to the same assignee as the present application. As used in the present invention, such a network will desirably have the capability to respond to a code consisting of six tones, the first five being paging or calling tones which occupy in the aggregate a time interval of 165 milliseconds, and the sixth of which occurs in the 35 millisecond interval heretofore reserved as a gap between pages, and is used as a dual-address tone. Lines 11 and 111 are both normally "high". Address selection is made with a negative-going pulse 112 that is supplied to one of them by the tone-responsive network 14, depending on the presence or absence of the sixth tone. It is a usual property of multi-tone decoder networks to incorporate a system of logic for sequencing the network through a set of frequencies unique to the particular receiver. This logic system, as part of its function, will determine not only whether or not a page is received, but also whether or not a sixth tone exists with it. This information is fed to lines 11 and 111. If the sixth tone is absent, line 111 will have that pulse 112; if the sixth tone is present, line 11 will have that pulse; and thereby the dual-address memory 13 will be set in one or the other of its two possible states. This in turn sets line 37 either high or "low", to set the condition of the signal-mode selector 19.

The state of the dual-address memory 13 is not affected by operation of the push-button 28, as either a reset button or a recall button. Rather, the dual-address memory 13 remains in an existing state until a paging signal is received having a tone-code composition that can alter its state. Thus, when the page memory 32 is interrogated, by operating the push-button 28 as a recall means, the alert signal that is recalled will be in that mode which is determined by the then-existing state of the dual-address memory 13. In this way the present invention assures not only that a page is remembered, but also that the particular address that was paged is also remembered. As presently illustrated, a paging receiver that incorporates the invention and which has stored a paging signal will answer a memory interrogation with an alert signal in the form of a slow-rate beep or a high-rate beep, depending upon the address that was paged.

Figure 2:
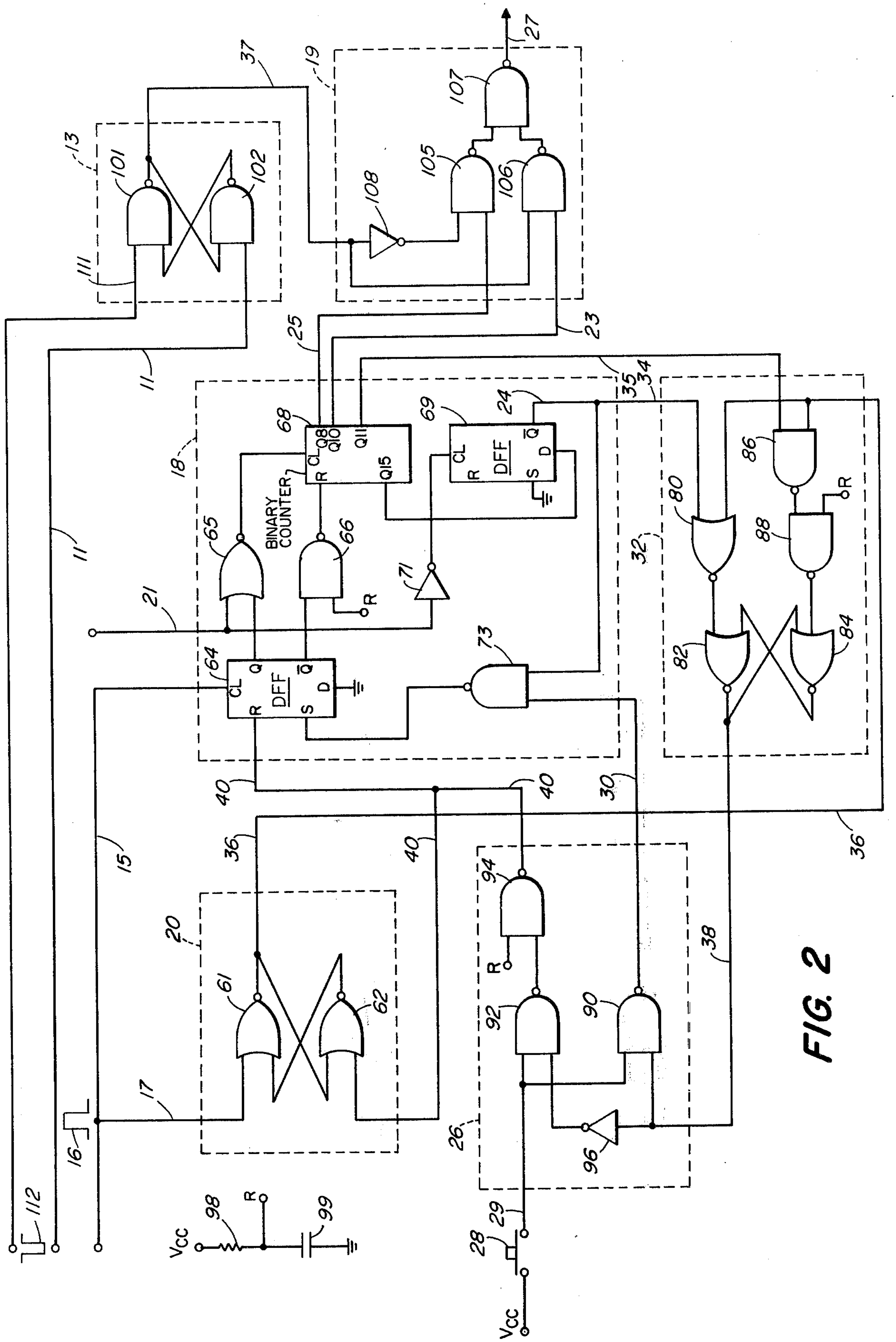
FIG. 2 illustrates logic circuitry that may be incorporated in blocks 13, 18, 19, 20, 26 and 32 of FIG. 1; and, FIG. 3 illustrates the logic circuitry of block 24 of FIG. 1.

In FIG. 2 the paging or calling signal memory 20 includes a static flip-flop comprised of two cross-coupled NOR gates 61 and 62. When a pulse 16 occurs line 36 goes low setting the page memory 32 in condition to be put in a stored-page state via line 34. The timed signal gate block 18 includes a D-type flip-flop (DFF) 64, a NOR gate 65, a NAND gate 66, a 15-stage binary counter 68, a second D-type flip-flop (DFF) 69, an inverter 71, and a second NAND gate 73, interconnected as shown. When pulse 16 occurs at terminal CL, and Q-output of the first DFF 64 goes low, allowing the clock signal on line 21 to be fed into the binary counter 68 via the first NOR gate 65. It is a known property of such binary counters to provide at various output terminals thereof voltage pulses at frequencies that are binary divisions of the clock frequency (i.e.: the clock frequency divided by 2, 4, 8, 16, etc.) In a complete cycle of operation, which lasts for a fixed predetermined interval of time, line 23 will have a train of 16 pulses from output Q10 on it, and line 25 will have a train of 64 pulses from output Q8 on it. Under control of the dual-address memory, one of the other of these outputs is applied to drive the alert signal generator 24. Since both trains occur in the same time interval, the 16-pulse train produces a "slow-rate" beep, and the 64-pulse train a "high-rate" beep, from the alert signal generator. At the end of the fixed time interval, the Q15 output of the counter 68 goes high driving the D terminal of the second DFF 69 also high. When the next clock pulse to the CL terminal of DFF 69 goes high, the $\overline{Q}$ output goes low and, via line 34 and the second NAND gate 73 causes the set terminal S of the first DFF 64 to go high. This causes the Q-output of DFF 64 to go high and the $\overline{Q}$ output to go low, in turn cutting off the clock to the binary counter 68 and resetting all Q-states of the binary counter to low by feeding the $\overline{Q}$ low signal to the reset terminal R via the first NAND gate 66.

At the same time the low signal on line 34 is fed into the page memory 32, which contains a NOR gate 80, a pair of NOR gates 82, 84 cross-coupled, and first and second NAND gates 86, 88, respectively. When line 34 goes low simultaneously with line 36 being low, the page memory 32 is set into a stored-page state. If line 36 is high, a low signal on line 34 will not set the page memory into a stored-page state. Page memory is thusly set through decision of NOR gate 80, which sends a high signal to the cross-coupled NOR gates 82, 84. Line 38 goes low, thereby indicating a stored page to the recall/reset mechanism 26, which contains three NAND gates 90 92, 94 and an inverter 96. To recall a stored page from the memory 32, the push-button 28 is pressed causing line 29 to go high. This high signal is applied to NAND gates 90 and 92 in shunt. If line 28 is then low, the decision process of the NAND gates 92, 94 will cause line 40 to go high, which in turn sets the Q-output of the first DFF 64 low, and that event starts the alert sequence of the binary counter 68. At the same time, the high signal on line 40 is fed into the paging or calling signal memory 20, causing line 36 to go high. The timed signal gate 18 is now going through its cycle, operating the alert signal generator 24, with the added operation of resetting the page memory 32 to a non-stored-page condition via line 35 in conjunction with the high signal on line 36. Line 35, which is connected to output Q11 of the binary counter 68, will go high after Q10 has gone high and gone low once, that is after the first of 16 cycles of the 16-pulse train that appears at output Q10 of the counter; this insures at least one pulse of alert signal at the slow rate from the generator 24 before the page memory 32 is reset, or four pulses at the high rate, depending on the then-existing state of the dual-address memory 13.

The dual-address memory contains two cross-coupled NAND gates 101 and 102, with lines 11 and 111 being applied, respectively, to an input of each.

When the sixth tone is absent from a paging or calling signal, line 111 will have the negative-going pulse 112, and line 37 will go high. Conversely, when the sixth tone is present, the negative-going pulse 112 will be on line 11, and line 37 will be low.

The signal mode selector 19 is essentially a switch including three NAND gates 105, 106 and 107, and an inverter 108. When line 37 is high the decision process of the NAND gates will be such that the train of 16 pulses in line 23 will be fed through to line 27. When line 37 is low, the decision process will cause the train of 64 pulses on line 25 to be fed through to line 27.

The decision process of NAND gates 86, 88 in the page memory 32 with lines 35 and 36 both high will switch line 38 to a high state. This sets the recall-reset mechanism 26 into a reset condition to enable manual termination of an alert signal via the push-button 28. When lines 38 and 29 are both high simultaneously, the decision process of NAND gate 90 will cause line 30 to go low, and via NAND gate 73 this applies a high signal to the set terminal S of the first DFF 64, to terminate the alerting sequence of the timed signal gate 18. Simultaneously, line 40 remains low and has no effect on DFF 64.

Vcc is the (+) operating voltage applied via resistor 98 and capacitor 99 to terminal R. This initiates the states of the various flip-flops in the circuit, such that an alerting sequence will occur on turn-on of the system, to indicate that the system is functioning. The system can be reset manually via push-button 28, or this turn-on alert signal will continue to the end of cycle of the timed signal gate 18, without storing a page in the memory 32, for the reason that the turn-on event does not supply a signal pulse 16 to the paging signal memory 20.

Figure 3:
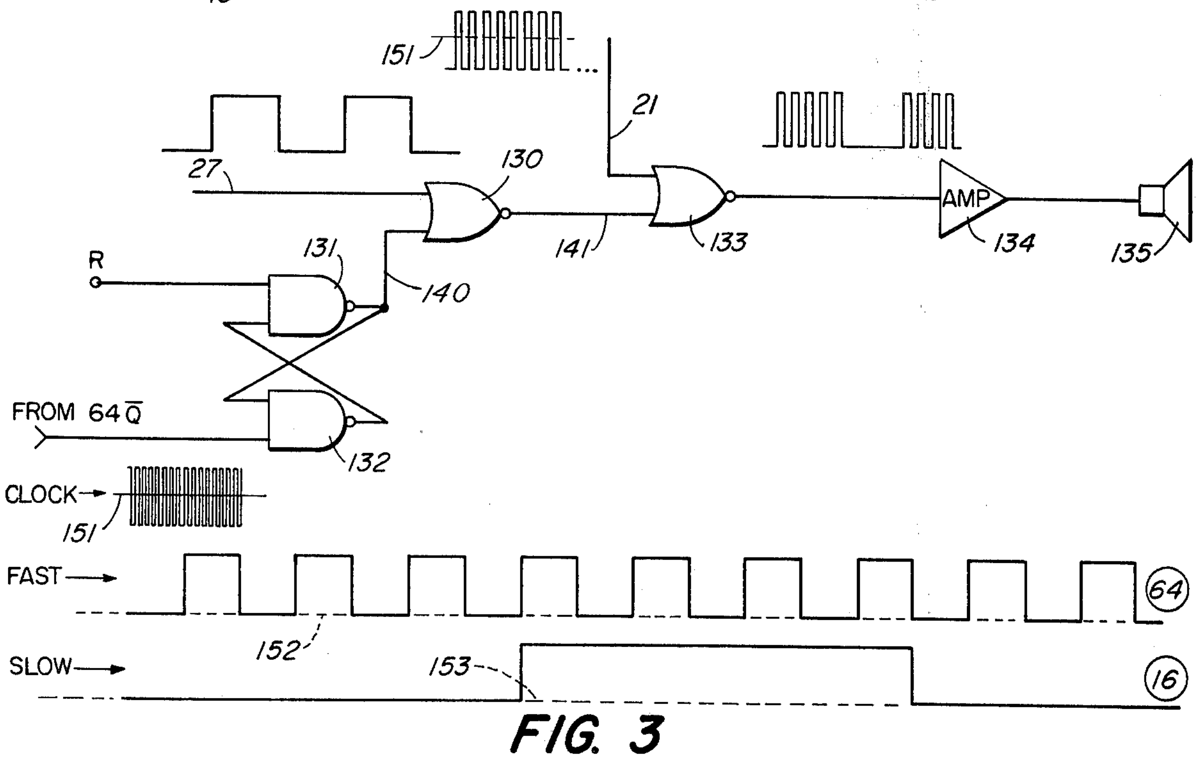

FIG. 3, showing a representative circuit for the alert signal generator 24, includes first and second NOR gates 130 and 133, a pair of NAND gates 131, 132 cross-coupled as a static flip-flop, an amplifier 134 and a loudspeaker 135, interconnected as shown. The alerting signal line 27 is connected to one input of the first NOR gate 130. The static flip-flop has terminal R connected to one input at NAND gate 131, and the other input at NAND gate 132 is connected to the $\overline{Q}$ output of the first DFF 64 in the timed signal gate 18. On turn-on, terminal R goes low and puts a low on the input to NAND gate 131, causing line 140 to go high. When line 140 is high the decision process of the first NOR gate 130 causes line 141 to be low; and the decision process of the second NOR gate 133 causes the clock pulses on line 21 to be fed without interruption into the amplifier 134, which drives the loudspeaker 135. On manual reset via button 28, or upon automatic termination of the operating cycle of the timed signal gate 18, terminal $\overline{Q}$ of the first DFF 64 will go low, all as is described above, and this will switch line 140 to a low state. The decision process of the first NOR gage 130 with the input at line 140 low will permit a signal on line 27 to appear inverted on line 141. That signal will be a 16- or 64- pulse-train, as is explained above. If line 27 is low, (i.e.: no page signal) line 141 will be high, and the clock signal on line 21 will not appear at the amplifier 134. When an alerting signal appears on line 27, an interrupted CW signal from the clock 21 will be applied to the amplifier 134, the interruption rate being 16 or 64 pulses in the allotted time interval, as is evident from the waves shown at the bottom of FIG. 3, representing on base 151 the clock signal, on base 152 the fast-beep alerting signal and on base 153 the slow-beep alerting signal. In this manner, a turn-on signal is distinguished from a paging signal. An advantage is that a battery interruption in the absence of a received calling signal will be perceived as a turn-on, and not as a false paging signal.

I claim:

1. In an alerting device that is responsive to a calling signal of the multi-address type to initiate an alerting signal which indicates address information contained in said calling signal, means including time interval measuring means responsive to said calling signal to provide said alerting signal for a predetermined time interval, said device including means to provide at least a first alerting signal of a first mode and a second alerting signal of a second mode, an alerting signal output, and signal mode selector means which is settable to select one of said modes for application to said alerting signal output, means to sense an address indicator in a calling signal and to provide an address-responsive output signal, address-responsive means to receive said address-responsive output signal and correspondingly to set said signal mode selector means to select said one of said modes, said time interval measuring means including means automatically to terminate said alerting signal after said predetermined time interval, alerting signal memory means, said time interval measuring means including means for setting said alerting signal memory means in a stored-page state upon automatically terminating said alerting signal, and recall means to institute operation of said device while said alerting signal memory means is in said stored-page state for again initiating said alerting signal in said selected mode.

2. Alerting device according to claim 1 wherein said first mode and said second mode are pulse trains having respectively "*N*" cycles and "*m*" cycles in said time interval, where *n* and *m* are different quantities.

3. Alerting device according to claim 2 having a master clock providing a clock frequency, and means to provide said pulse trains at respective sub-harmonics of said clock frequency.

4. Alerting device according to claim 3 wherein said time interval measuring means includes a binary counter under control of said clock to produce a prescribed number of output pulses constituting said time interval, said clock being coupled to said counter for control thereof.

5. An alerting device according to claim 1 having manually-operable reset means to terminate said alerting signal within said predetermined time interval, said manually-operable means having alternatively a reset state and a recall state into which said manually-operable means can be set, means coupling said manually-operable means to said time interval measuring means for terminating operation of said time interval measuring means and thereby terminating said alerting signal if said manually-operable means is operated when it is in said reset state, means coupling said manually-operable means to said time interval measuring means for initiating a time interval measuring cycle thereof and thereby initiating said alerting signal if said manually-operable means is operated when it is in said recall state, said time interval measuring means including means for setting said alerting signal memory means in said stored-page-state upon said time interval measuring means automatically terminating said alerting signal at the end of said predetermined time interval in the absence of operation of said manually operable means when the latter is in said reset state, and said alerting signal memory means being coupled to said manually operable means for setting said manually-operable means into said recall state when said alerting signal memory mens is set into said stored-page state, said manually-operable means in said recall state constituting said recall means to initiate operation of said device.

6. Alerting device according to claim 5 including calling signal memory means having an input coupled to said calling signal and an output coupled to said alerting signal memory means, said calling signal memory means having a first output state and a second output state and including means responsive to said calling signal to set said calling signal memory means from said first output state into said second output state, said calling signal memory means in said second output state putting said alerting signal memory means into a condition wherein the latter can be set into said stored-page-state.

7. Alerting device according to claim 6 including a coupling from said manually-operable means to said calling signal memory means for setting said calling signal memory means from said second output state into said first output state when said manually-operable means is operated while said manually-operable means is in said recall state.

8. Alerting device according to claim 7 including a coupling from said time interval measuring means to said alerting signal memory means for resetting said alerting signal memory means into a non-stored-page state after said manually-operable means is operated while the latter is in said recall state, said alerting signal memory means being coupled to said manually-operable means for setting said manually-operable means into said reset state when said alerting signal memory means is in said non-stored-page state.

9. Alerting device according to claim 5 having a master clock providing a clock frequency, said time interval measuring means coupled to said clock to generate first and second pulse trains at respective frequencies that are sub-harmonics of said clock frequency, said first and second pulse trains constituting said first mode and said second mode, respectively.

10. Alerting device according to claim 9 wherein said time interval measuring means includes a binary counter, under control of said clock, to produce a different prescribed number of output pulses in each of said modes, respectively, constituting said predetermined time interval, said clock being coupled to said counter for control thereof.

11. Alerting device according to claim 10 including gate means in the coupling between said clock and said counter, and means including said gate for selecting one or the other of said calling signal when said manually-operable means is in said reset state, and an operation of said manually-operable means when in said recall state for initiating a time-measuring cycle of said counter.

12. Alerting device according to claim 10 including an alert signal generator for providing an alert signal to a user in response to said alerting signal, and means under control of said signal mode selector means for selectively coupling one or the other of said modes of output pulses as said alerting signal to said alert signal generator.

13. Alerting device according to claim 10 wherein said manually-operable means when operated in said reset state terminate an operation of said binary counter prior to the end of said prescribed time interval.

14. Alerting device according to claim 1 including an alert signal generator for providing an alert signal to a user in response to said alerting signal, a coupling for said alerting signal via said signal mode selector means to said alert signal generator, and means to drive said generator in the selected one of said alerting signal modes.

15. Alerting device according to claim 14 including electromechanical transducer means, driver means therefor, clock means for supplying a continuous clock-frequency wave, means responsive to said continuous wave to generate first and second pulse trains in said time interval at respective first and second frequencies that are different subharmonics of said clock-frequency, and means coupling said signal mode selector means to said alert signal generator to apply a selected one of said pulse trains to said driver means, for driving said alert signal generator in said selected alerting signal mode.

16. In an alerting device according to claim 14 including a source of energizing power and means to apply said source to energize said device, means responsive to the application of said source to said alert signal generator to drive said generator in a unique mode that is different from either of said alerting signal modes.

17. Alerting device according to claim 16 including electromechanical transducer means, driver means therefor, clock means for supplying a continuous clock-frequency wave, means responsive to said continuous wave to generate first and second pulse trains at respective first and second frequencies that are different sub-harmonics of said clock frequency, means to couple said continuous wave to said driver means, means responsive to the application of said source to said alert signal generator to couple said continuous wave to said electromechanical transducer means for driving said alert signal generator in said unique mode, and means responsive to said alerting signal to couple a selected one of said pulse trains to said driver means for driving said alert signal generator in said selected alerting signal mode.

* * * * *

UNITED STATES PATENT OFFICE
CERTIFICATE OF CORRECTION

Patent No. 4,010,461 Dated March 1, 1977

Inventor(s) Thomas Raymond Stodolski

It is certified that error appears in the above-identified patent and that said Letters Patent are hereby corrected as shown below:

Column 4, line 39, change "and" to --the--

Column 5, line 11, after "90" insert --,-- line 14, change "28" to --38--

Column 7, line 5, change ""N"" to --"n"-- line 42, change "mens" to --means--

Signed and Sealed this

*Eighteenth* Day of *October 1977*

[SEAL]

*Attest:*

RUTH C. MASON
*Attesting Officer*

LUTRELLE F. PARKER
*Acting Commissioner of Patents and Trademark*